United States Patent
Kisanuki et al.

(10) Patent No.: US 9,743,034 B2
(45) Date of Patent: Aug. 22, 2017

(54) VIDEO TRANSMITTING/RECEIVING DEVICE AND VIDEO DISPLAY DEVICE

(71) Applicant: HITACHI MAXELL, LTD., Ibaraki-shi, Osaka (JP)

(72) Inventors: Takeru Kisanuki, Tokyo (JP); Nobuaki Kabuto, Tokyo (JP); Hiroaki Itou, Tokyo (JP); Keisuke Inata, Tokyo (JP); Tetsuya Sakamoto, Osaka (JP); Nobuo Masuoka, Osaka (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 15/323,740

(22) PCT Filed: Jul. 16, 2014

(86) PCT No.: PCT/JP2014/068917
§ 371 (c)(1),
(2) Date: Jan. 4, 2017

(87) PCT Pub. No.: WO2016/009507
PCT Pub. Date: Jan. 21, 2016

(65) Prior Publication Data
US 2017/0171507 A1    Jun. 15, 2017

(51) Int. Cl.
*H04N 7/01* (2006.01)
*H04N 5/38* (2006.01)
(Continued)

(52) U.S. Cl.
CPC ............. *H04N 7/0125* (2013.01); *H04N 5/38* (2013.01); *H04N 5/44* (2013.01); *H04N 5/775* (2013.01); *H04N 7/0117* (2013.01); *H04N 19/44* (2014.11)

(58) Field of Classification Search
CPC ........ H04N 7/0125; H04N 19/44; H04N 5/38; H04N 5/44; H04N 5/775; H04N 7/0117;
(Continued)

(56) References Cited

U.S. PATENT DOCUMENTS

2009/0109332 A1*    4/2009    Lin ..................... H04N 21/4113
                                                                348/441

FOREIGN PATENT DOCUMENTS

| JP | 09-027948 A | 1/1997 |
| JP | 2011-119828 A | 6/2011 |
| JP | 2014-082673 A | 5/2014 |

OTHER PUBLICATIONS

IT Frontier (Nikkei Business Reduced-size edition DVD, Apr. 10, 1995, pp. 58 to 60.
(Continued)

*Primary Examiner* — Sherrie Hsia
(74) *Attorney, Agent, or Firm* — Mattingly & Malur, PC (57) ABSTRACT

A video transmitting/receiving device includes: a receiving unit which receives video content; a converting unit which performs predetermined conversion on a video signal included in the video content; an information adding unit which adds a complement signal to the video signal converted by the converting unit; an input/output unit which inputs information of an external device and outputs the video signal; and a control unit, and the control unit performs control to select and output one of the video signal before performing the conversion by the converting unit, the video signal which has been converted by the converting unit, and the video signal to which the complement signal has been added by the information adding unit, in accordance with device information of the external device serving as an output destination, which is obtained by the input/output unit.

8 Claims, 10 Drawing Sheets

(51) Int. Cl.
*H04N 5/44* (2011.01)
*H04N 19/44* (2014.01)
*H04N 5/775* (2006.01)

(58) Field of Classification Search
CPC ...... H04N 7/01; H04N 5/4401; H04N 21/436; H04N 21/431
USPC ............... 348/441, 453, 723, 725, 458, 459; 725/85, 98, 100, 118, 131, 139, 148, 151
See application file for complete search history.

(56) References Cited

OTHER PUBLICATIONS

IT frontier (Nikkei Business reduced edition DVD, Apr. 10, 1995, pp. 58 to 60.
International Search Report of PCT/JP2014/068917 dated Oct. 21, 2014.

* cited by examiner

FIG. 11

VIDEO TRANSMITTING/RECEIVING DEVICE AND VIDEO DISPLAY DEVICE

TECHNICAL FIELD

The present invention relates to a video transmitting/receiving device and a video display device.

BACKGROUND ART

A background art of this technical field is, for example, EDTV-II (wide clear vision) (see, for example, Non-Patent Document 1). Non-Patent Document 1 describes that "EDTV2 supposedly incorporates the methods for returning the number of scanning lines lost due to an increase in an aspect ratio in a horizontal direction to original 483 in standards. One of the methods is "complement processing of vertical resolution". It is only required that a broadcast station broadcasts this signal and a television which supports EDTV2 and has a built-in device which can receive this signal receives this signal."

RELATED ART DOCUMENTS

Non-Patent Documents

Non-Patent Document 1: IT frontier (Nikkei Business reduced edition DVD, 1995/04/10, pages 58 to 60)

SUMMARY OF THE INVENTION

Problems to be Solved by the Invention

As definition of video content becomes higher and three-dimensional video images configured by disparity images become popular, a data amount of the video content has been increasing. However, since a transmission band is limited, when a data amount of video images becomes larger, it is necessary to reduce the data amount in accordance with a transmission channel instead of transmitting the video content as is. However, there is a probability that the reduction of the data mount of the video content deteriorates image quality. For example, in a method for reducing the data amount per unit time by lowering a frame rate, a time interval between frames becomes longer, and thus the continuity in motion is lost, which causes the deterioration of image quality. Further, in a method for reducing the data amount per frame by lowering resolution, the deterioration of image quality is caused due to decrease in the resolution.

The EDTV-II standards define that a broadcast station multiplexes a complement signal on a video signal transmitted by an existing broadcast wave and transmits the video signal and a television which supports the complement signal performs complement processing. In this method, however, the broadcast station needs to generate the complement signal, and thus the complement processing does not always match the viewing environment of users.

The present invention provides a video transmitting/receiving device which solves the above problems, and outputs a video signal suitable to a video display device for viewing high-definition video images.

Means for Solving the Problems

A summary of a typical aspect of the invention disclosed in this application will be briefly described as follows. For example, the summary of one aspect of the present invention is that a complement signal is generated in accordance with information of a device serving as an output destination, and the complement signal is output after being added to a video signal whose data amount has been reduced.

Effects of the Invention

According to the present invention, it is possible to provide a video transmitting/receiving device which outputs a video signal suitable to a video display device.

DETAILED DESCRIPTION OF PREFERRED EMBODIMENTS

Embodiments of the present invention will be described below with reference to the drawings.

First Embodiment

[Configuration Example of Video Transmitting/Receiving Device]

Figure 1:
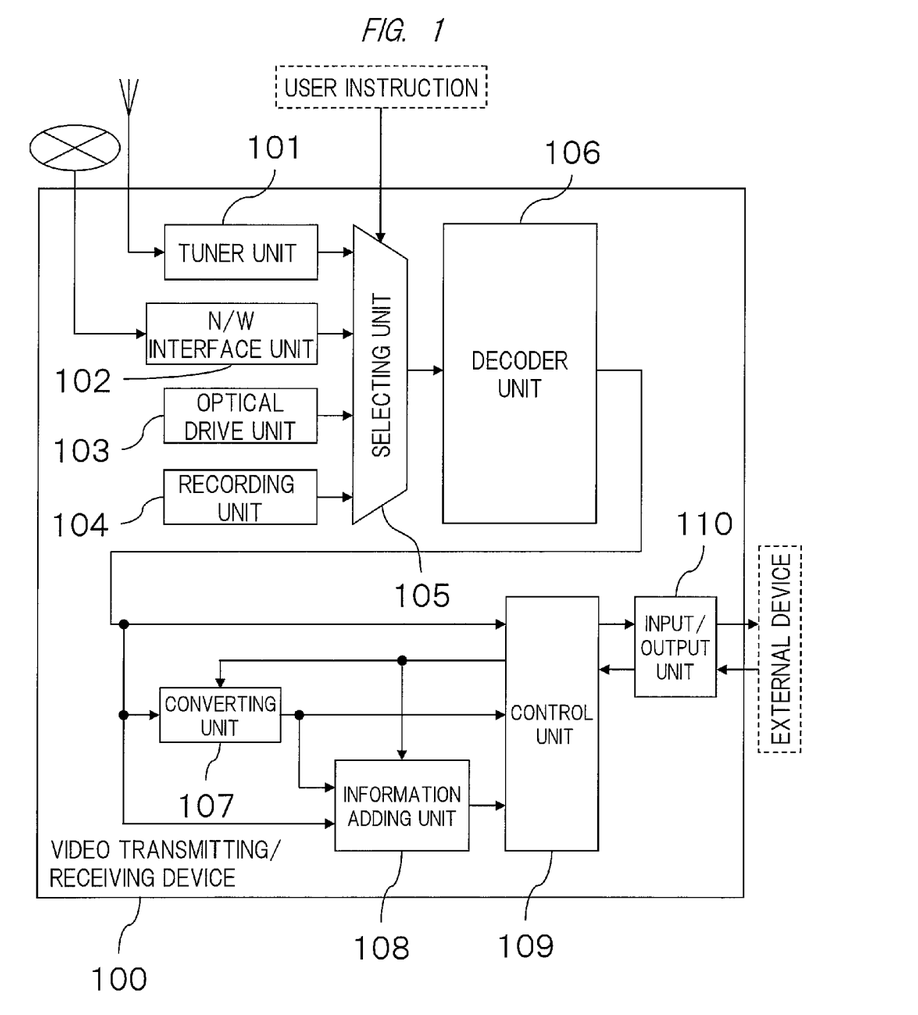
FIG. 1 is a view illustrating a configuration example of a video transmitting/receiving device.

FIG. 1 is a view illustrating a configuration example of a video transmitting/receiving device 100 according to the first embodiment of the present invention. The video transmitting/receiving device 100 is configured by using a tuner unit 101, a network (N/W) interface unit 102, an optical drive unit 103, a recording unit 104, a selecting unit 105, a decoder unit 106, a converting unit 107, an information adding unit 108, a control unit 109 and an input/output unit 110 as appropriate.

The tuner unit 101 is connected with an antenna which receives a broadcast wave via a coaxial cable, and generates video content by demodulating the received broadcast wave. Note that the video content is configured by meta data including information related to a video signal or video encoded according to MPEG2, H.264 or H.265. The network interface unit 102 generates video content by analyzing video content distributed in a packet data format by using a network such as an IP (Internet Protocol). The optical drive unit 103 reads video content recorded in an optical medium such as a BD (Blu-ray (registered trademark) Disc).

The recording unit 104 reads video content recorded in an information recording medium such as an HDD (Hard Disk Drive) or an SSD (Solid State Drive). The selecting unit 105 functions as a receiving unit which receives video content from each of the tuner unit 101, the network interface unit 102, the optical drive unit 103 and the recording unit 104, and selects video content to be output from video contents input in accordance with the setting instruction from a user via a remote controller or a button and outputs the selected video content.

Note that, when the video transmitting/receiving device includes a wireless communication unit which enables Wi-Fi connection, the setting instruction from a user can be received also via, for example, an application of a Wi-Fi connected smartphone through a wireless LAN router without the dedicated remote controller or the like, and the video content may be selected in accordance with the instruction.

The decoder unit 106 decodes the video content, and generates non-compressed video signal.

The converting unit 107 performs predetermined conversion processing on a video signal. The information adding unit 108 adds a complement signal to the video signal. The control unit 109 selects the video signal to be output in accordance with information of the video content and information of a video display device serving as a connection destination.

The input/output unit 110 receives an input of device information related to the connected video display device, and outputs the video signal selected by the control unit 109 to the video display device connected via an HDMI (registered trademark) cable or the like.

Next, an operation of the video transmitting/receiving device 100 according to the present embodiment will be described.

The selecting unit 105 selects the video content to be output to the decoder unit 106 from those of the tuner unit 101, the network interface unit 102, the optical drive unit 103 and the recording unit 104 based on an input from a user. For example, the user selects video content output from the tuner unit 101 when viewing a terrestrial digital broadcasting, the user selects video content output from the network interface unit 102 when viewing an IPTV, the user selects video content output from the optical drive unit 103 when viewing a movie recorded in an optical medium such as a BD, and the user selects video content output from the recording unit 104 when viewing a program recorded in advance in the recording unit 104.

The decoder unit 106 decodes the encoded video signal included in the video content selected by the selecting unit 105, and generates a non-compressed video signal.

The converting unit 107 performs conversion processing such as resolution reduction or tone reduction so that the non-compressed video signal generated by the decoder unit 106 falls within a transmission band. The method of conversion processing is selected by learning a method supported by the connected video display device based on device information obtained in advance. For example, a case where the user views high-resolution 3D video content including motions will be described. Input content has resolution of 3840×2160 (hereinafter, referred to as 4K2K), and left-eye and right-eye disparity images are displayed at a frame rate of 60 Hz. Further, the video display device has a function of displaying the resolution of 4K2K at 120 Hz.

Meanwhile, it is presupposed that a transmission channel which connects the video transmitting/receiving device and the video display device can transmit a video image of the resolution of 4K2K at a frame rate up to 60 Hz as a baseband video signal as standardized by HDMI2.0. In such a case, since the transmission channel becomes a bottle neck and input content cannot be viewed as is, it is necessary to transmit the input content after reducing the data amount to ½.

Examples of the method of reducing the data amount include a method of lowering a frame rate and a method of lowering resolution. However, when a frame rate of this input content is reduced to ½, a frame rate for one eye becomes 30 Hz, and motions sometimes become unsmooth and unnatural in the case of video images of speedy motions such as sports. Meanwhile, even when the resolution is reduced to ½, the resolution is not less than Full HD (1920×1080). Consequently, by appropriately performing scaling processing and displaying video images on a display side, it is possible to view video images of high resolution and smooth motions.

Hence, the resolution is reduced to ½ in a vertical direction, thereby obtaining the converted video signal having the transmittable data amount with the resolution of 3840×1080 at 120 Hz. Further, as described above, the conversion processing method supported by the video display device is obtained in advance before the conversion processing is performed. Information of the video display device is obtained by, for example, inter-device communication via an HDMI.

Note that it is also possible to record the device information of a video display device which has been connected once in a memory or the like so that detailed device information can be read instantly from the memory or the like when connection to the same video display device is made again.

The information adding unit 108 adds to the video signal a complement signal for generating a display video image by complementing the video signal converted by the converting unit 107 by using difference information. By learning information related to complement processing of the video display device serving as a connection destination via inter-device communication of HDMI in advance, and predicting a pixel value of a video signal generated by performing predetermined enlargement processing from a baseband video signal in order for the video display device to perform the complement processing, the complement signal is generated based on a difference value between the predicted pixel value and the pixel value of the non-compressed video signal which is not yet converted by the converting unit 107.

In the case of the output via the HDMI, the converted video data is transmitted as the baseband signal, and the complement signal is added to an info frame. When a data size to be added is large, compression processing supported by the video display device is performed to reduce the data amount before adding.

When the video display device performs the complement processing, it is possible to restore input video content of the video transmitting/receiving device 100 by performing predetermined enlargement processing on the baseband video signal and then performing the complement processing to add and return the complement signal.

Figure 10:
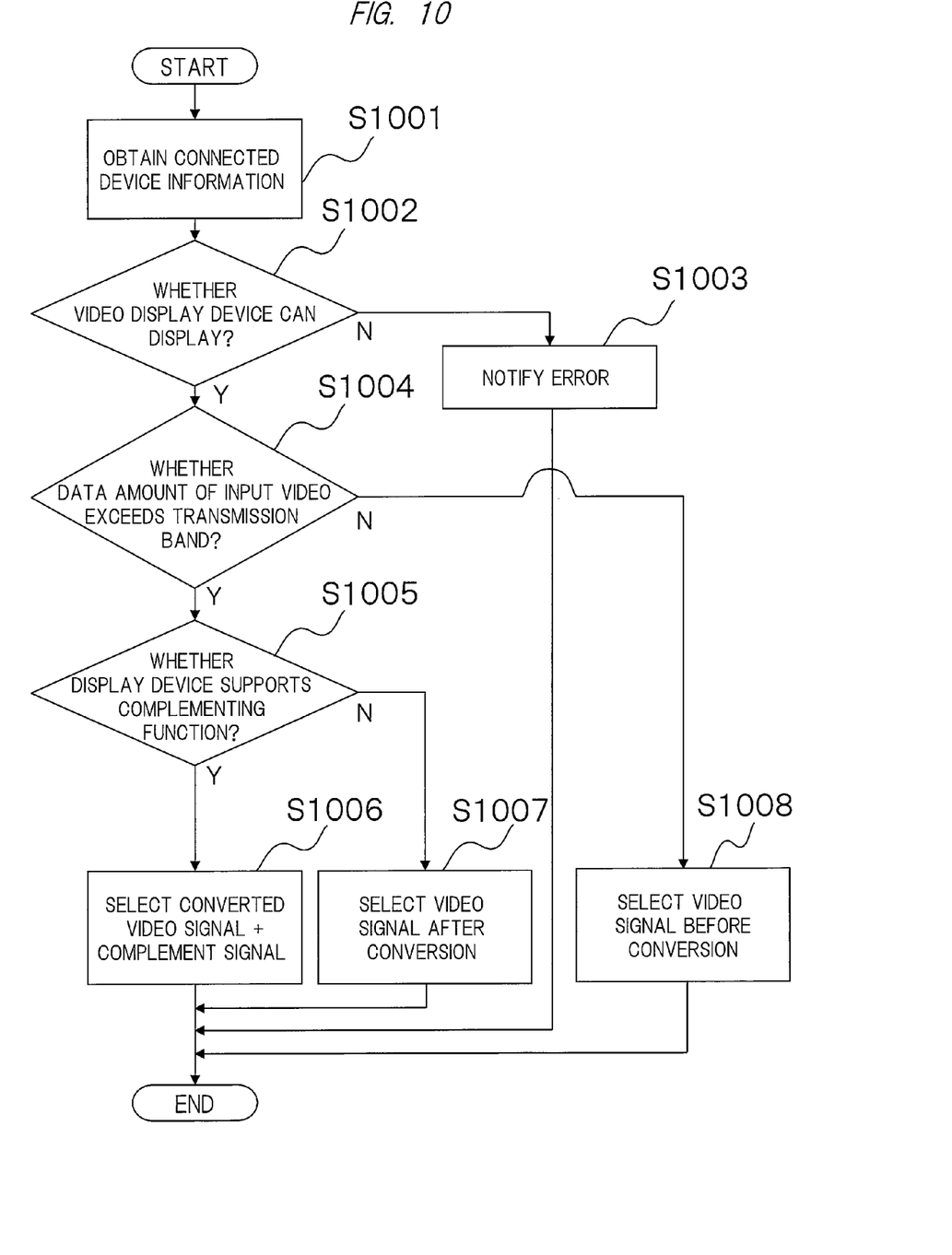
FIG. 10 is a view illustrating a determination flow of a control unit.

The control unit 109 selects an output signal in accordance with a selection flow illustrated in FIG. 10.

In S1001, inter-device communication with the connected video display device is performed to obtain information of the device serving as a connection destination including information related to a complementing function, and the flow moves to S1002. In S1002, whether or not a non-compressed video signal generated by the decoder unit 106 is supported by the video display device is determined from a viewpoint of resolution, a frame rate and a zoom display by a zoom function, based on the obtained device information. When it is determined in S1002 that the non-compressed video signal is supported, the flow moves to S1004, and when the non-compressed video signal is not supported, the flow moves to S1003.

In S1003, the user is notified that the video display device cannot display the input video image. In S1004, when the non-compressed video signal generated by the decoder unit 106 is transmitted as is, it is determined whether or not the non-compressed video signal exceeds the transmission band after the input/output unit 110. When it is determined in S1004 that the non-compressed video signal exceeds the transmission band, the flow moves to S1005, and when the non-compressed video signal does not exceed the transmission band, the flow moves to S1008.

In S1005, it is determined whether or not the connected video display device supports the complementing function of performing the complement processing using the complement signal added by the information adding unit 108. When it is determined in S1005 that the connected video display device supports the complementing function and the complementing function is in an ON state, the flow moves to S1006, and when the connected video display device does not support the complementing function or the complementing function is in an OFF state, the flow moves to S1007.

In S1006, the converted video signal to which the complement signal generated by the information adding unit 108 has been added is selected as a video signal output from the input/output unit 110. In S1007, the converted video signal generated by the converting unit 107 is selected as the video signal output from the input/output unit 110. In S1008, the non-compressed video signal generated by the decoder unit 106 is selected as the video signal output from the input/output unit 110.

The input/output unit 110 outputs the video signal selected by the control unit 109 to the video display device serving as a connection destination in accordance with general standards such as the HDMI.

When the connected video display device does not support the complementing function, the connected video display device optionally scales and displays the video signal transmitted in the baseband. When the connected video display device supports the complementing function, the connected video display device performs the complement processing based on the video signal transmitted in the baseband and the complement signal and displays the video signal.

Further, a case where the resolution of the video display device is lower than resolution of an input video image will be described with reference to FIGS. 5 and 11.

Figure 5:
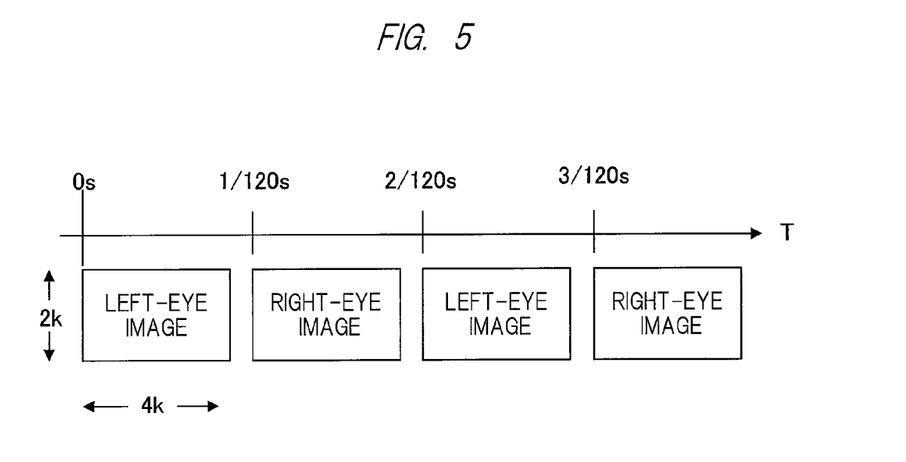
FIG. 5 is a view illustrating a video signal to be input.

FIG. 5 is a view illustrating an example of a video signal generated by the decoder unit 106 from input video content. A horizontal axis T represents a time, and indicates a video image of 4K2K and 120 Hz in which a video image of one frame is transmitted every $\frac{1}{120}$ sec. Further, video contents represent 3D video images configured by left-eye and right-eye disparity images, and data is alternately transmitted for each frame.

Figure 11:
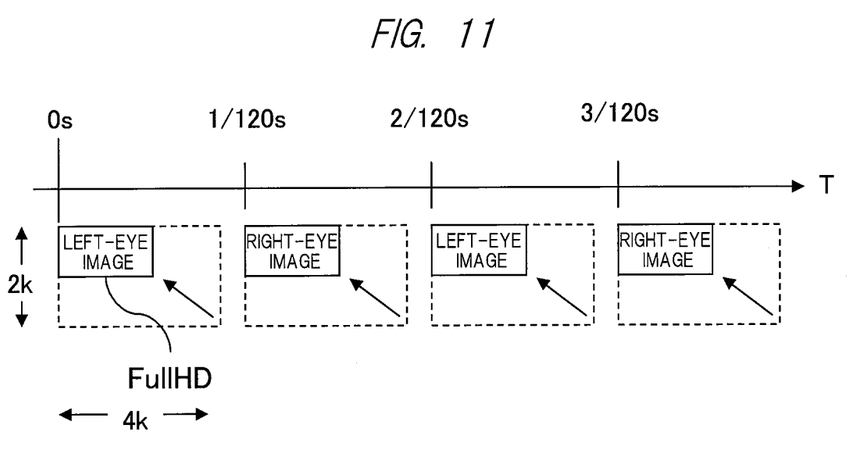
FIG. 11 is a view illustrating an example of a transmission signal when resolution of a video display device is low.

FIG. 11 illustrates an example where 3D video images described with reference to FIG. 5 are transmitted to the video display device with the Full HD resolution. A horizontal axis T represents a time like FIG. 5, a frame of 4K2K resolution is indicated by a dotted frame, and a frame formed by reducing the frame indicated by the dotted frame to the Full HD resolution is indicated by a solid line frame.

It is presupposed that an input video image is a 3D video image of 4K2K illustrated in FIG. 5, the video display device can support the Full HD resolution and a frame rate up to 120 Hz, and a transmission channel enables transmission of 4K2K video images standardized by HDMI2.0 at a frame rate up to 60 Hz.

In such a case, the video signal obtained by reducing the input video image in FIG. 5 to be the frame of the solid line frame illustrated in FIG. 11 by the converting unit 107 is transmitted, so that even the video display device with low resolution can display the video signal. Further, since the video signal is vertically and horizontally reduced to ½, the data amount is also reduced to ¼ and falls within the transmission band of the transmission channel.

By employing the above configuration, the video display device which supports the complement processing can display high-definition video images of smooth motions while maintaining the frame rate without increasing the transmission band. Further, even the existing video display device which cannot perform the complement processing can also display the video images.

[Configuration Example of Video Display Device]

Next, a video display device 700 which supports the complementing function will be described.

Figure 7:
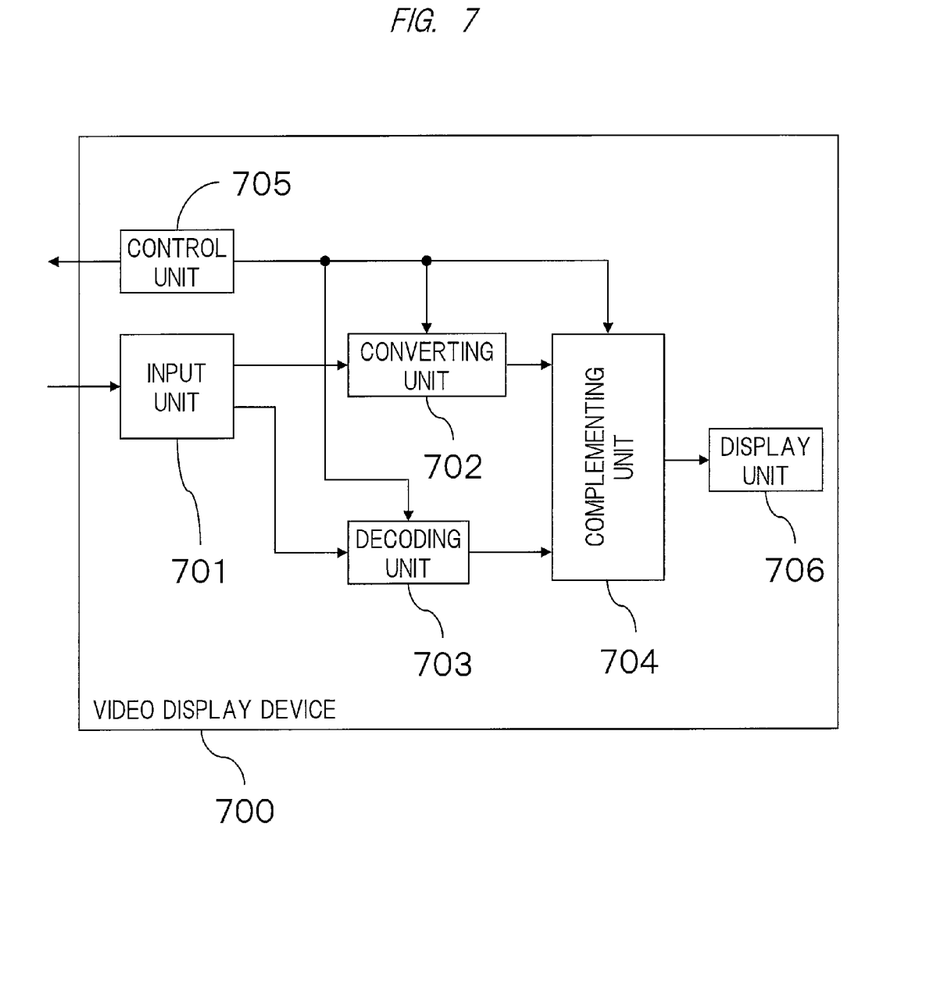
FIG. 7 is a view illustrating a configuration example of a video display device.

FIG. 7 is a view illustrating an example of the video display device 700 for displaying a video signal to which a complement signal has been added. In FIG. 7, the video display device 700 is configured by using an input unit 701, a converting unit 702, a decoding unit 703, a complementing unit 704, a control unit 705 and a display unit 706 as appropriate.

The input unit 701 receives an input signal transmitted from a device connected via an HDMI cable or the like, and demultiplexes the input signal to a baseband non-compressed video signal and meta data and then outputs them. The converting unit 702 performs conversion processing described later on the non-compressed video signal. The decoding unit 703 extracts the complement signal from the meta data. Further, when the complement signal is compressed, the decoding unit 703 performs the decompression processing.

The complementing unit 704 performs complement processing on the video signal output from the converting unit 702 based on the complement signal output from the decoding unit 703, thereby generating a high-definition video signal. The control unit 705 switches an operation of each unit in accordance with information of the input signal and a function of the display unit 706. The display unit 706 is a display device such as a liquid crystal panel and a plasma panel, and displays video signals.

Next, an operation of the video display device 700 according to the present embodiment will be described.

The input unit 701 demultiplexes a signal transmitted from the connected video transmitting/receiving device 100 (FIG. 1) to a non-compressed video signal and meta data and then outputs them. When the display unit 706 can display higher-definition video images than the non-compressed video signal output from the input unit 701, the converting unit 702 performs enlargement processing and tone addition processing on the non-compressed video signal so that the display unit 706 can display the video images.

For example, when the resolution is 3840×1080 and an aspect ratio is 16:9 as described above, the converting unit 107 performs enlargement processing so that the resolution is doubled in the vertical direction, and converts the non-compressed video signal into a 4K2K video image. The enlargement processing may be realized by simply doubling each line or inserting an average value of two consecutive lines as a complement line.

Naturally, the number of pixels of video images is doubled in these methods, but this does not mean that an input video image of the video transmitting/receiving device 100 (FIG. 1) can be restored.

The decoding unit 703 restores the complement signal added to the input video signal by the video transmitting/receiving device 100 (FIG. 1). As described above, the information adding unit 108 adds the complement signal to an info frame of the HDMI, and when a data size is large, the complement signal is compressed in the video transmitting/receiving device 100 (FIG. 1) in some cases. When the complement signal is compressed, decompression processing is performed to generate the complement signal.

The complementing unit 704 performs complement processing on the video signal generated by the converting unit 702 based on the complement signal generated by the decoding unit 703, thereby generating a display image. In performing the complement processing, the method of the enlargement processing performed by the converting unit 702 is notified via inter-device communication before the video transmitting/receiving device 100 generates the complement signal, so that the video transmitting/receiving device 100 can predict a pixel value after enlargement.

Hence, by retaining a difference value for each pixel between the video signal generated by the converting unit 702 and the input video signal of the video transmitting/receiving device 100 as a complement signal and performing the complement processing so as to add and return the complement signal to the video signal after the enlargement processing by the converting unit 702, the video display device 700 can restore the high-definition input video image received by the video transmitting/receiving device 100.

The control unit 705 controls each unit other than the control unit 705 and the display unit 706 to perform the series of complement processing described above. Further, in the case of the setting which does not use the complementing function, the control unit 705 switches an operation of each unit so as to display the non-compressed video signal output from the input unit 701 as is.

The setting which does not use the complementing function is, for example, a low power consumption mode or a game mode. In the case of the low power consumption mode, it is possible to suppress power consumption of the video display device 700 by stopping power supply to relevant circuits without performing the complement processing. In the case of the game mode, since it is possible to reduce a display delay of the video image by displaying the video image by the through output without performing the complement processing, responsiveness in the use of a game machine by a user can be improved.

Further, when the video transmitting/receiving device 100 makes an inquiry as to whether or not the complementing function is supported via inter-device communication, the control unit 705 transmits information related to the complementing function such as an output resolution or a complementing method. The display unit 706 displays the video signal output from the complementing unit 704.

According to the above configuration, the user can view restored high-definition video images obtained by performing the complement processing on video images generated by the video transmitting/receiving device 100.

[Converting Unit and Information Adding Unit (Resolution)]

Next, the converting unit 107 and the information adding unit 108 in the case where resolution is converted so as to fall within a transmission band will be described.

Figure 2:
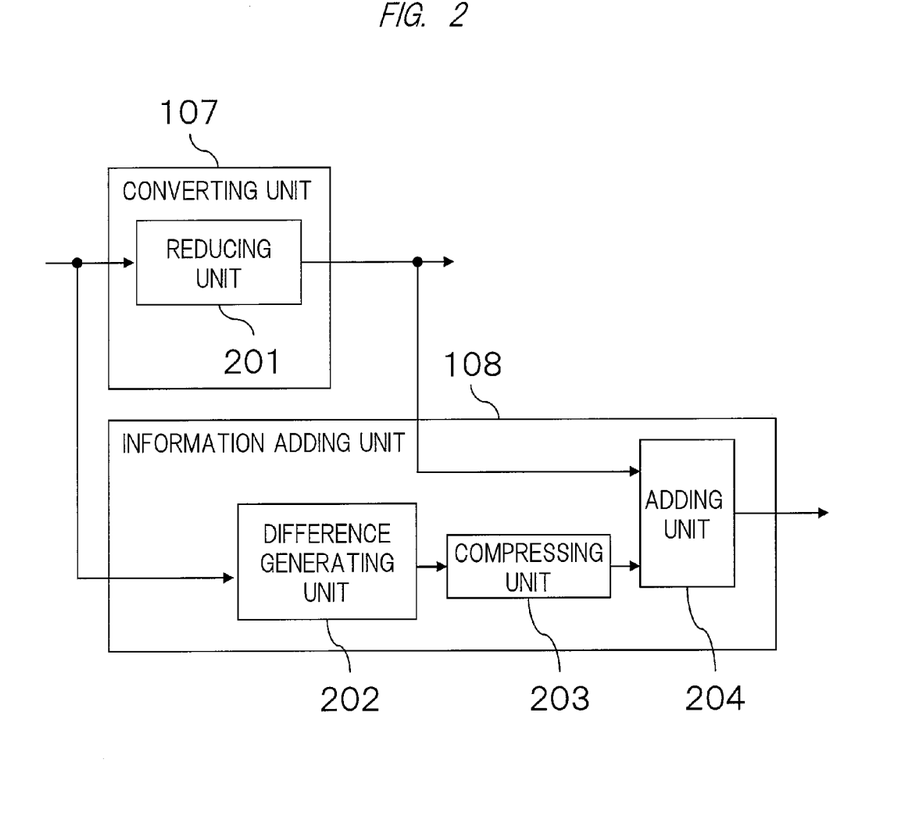
FIG. 2 is a view illustrating an example of a receiving device in the case where resolution is reduced.

FIG. 2 is a view illustrating a detailed configuration example of the converting unit 107 and the information adding unit 108 illustrated in FIG. 1. In FIG. 2, the converting unit 107 is configured to include a reducing unit 201 which performs resolution reduction processing for each pixel, and the information adding unit 108 is configured by using a difference generating unit 202 which generates difference information by comparing video signals before and after the converting unit 107 performs the conversion processing, a compressing unit 203 which generates a compressed signal whose data amount is reduced by performing the compression processing, and an adding unit 204 which adds the compressed signal to the video signal as appropriate.

The operations thereof will be described with reference to FIGS. 5, 6 and 8(*a*).

FIG. 5 illustrates that the 3D video image has the resolution of 4K2K as described above and a frame rate of a disparity image for a single eye is 60 Hz. The reducing unit 201 (FIG. 2) performs vertical ½ reduction processing so that the input video image illustrated in FIG. 5 falls within the transmission band. A conversion equation of the reduction processing will be described with reference to FIG. 8(*a*).

Figure 8A:
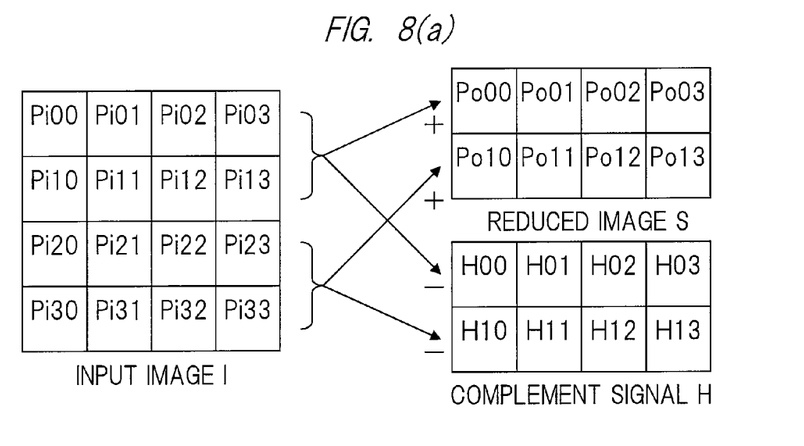
FIG. 8(a) is a view illustrating a pixel image when reduction and generation of a complement signal are performed.

FIG. 8(*a*) is a view illustrating a conversion example where a 4×4 input image I is subjected to the vertical ½ reduction processing and is converted into a 4×2 reduced image S. $Pi_{00}$ to $Pi_{33}$ represent pixels configuring the 4×4 input image I, and $Po_{00}$ to $Po_{13}$ represent pixels configuring the 4×2 reduced image S. Further, $H_{00}$ to $H_{13}$ represent a complement signal H to be added to the reduced image S.

Numbers of each element name in FIG. 8(*a*) correspond to a vertical coordinate and a horizontal coordinate of a pixel. A conversion equation for performing the vertical ½ reduction processing and generating the pixel $Po_{00}$ of the reduced image S is expressed by (equation 1).

$$Po_{00}=(Pi_{00}+Pi_{10})/2 \qquad \text{(Equation 1)}$$

Similarly, a conversion equation for generating the pixel $Po_{10}$ of the reduced image S is expressed by (equation 2).

$$Po_{10}=(Pi_{20}+Pi_{30})/2 \qquad \text{(Equation 2)}$$

As expressed by above (equation 1) and (equation 2), the reduction processing is performed by using an average value of an even-number line and an odd-number line of each two lines for the pixel after the reduction. Further, similar conversion is performed also in a horizontal direction. By performing the reduction processing for an entire screen like this on all frames, a reduced video signal is generated. By performing the above reduction processing, it is possible to generate a reduced video signal while suppressing an unnatural jaggy.

The difference generating unit 202 generates the complement signal H illustrated in FIG. 8(*a*) so as to perform the complement processing in the video display device 700 (FIG. 7). A generation equation of the complement signal $H_{00}$ is expressed by (equation 3).

$$H_{00}=(Pi_{00}-Pi_{10})/2 \qquad \text{(Equation 3)}$$

Also for other coordinates, a complement signal is generated according to the similar generation equation based on pixels having the same vertical positions of an even-number line and an odd-number line of each two lines. The compressing unit 203 performs compression processing to reduce the data amount of the complement signal generated by the difference generating unit 202, thereby generating a compressed complement signal.

As expressed by (equation 3), difference information is a difference value of pixels which are at a spatially close distance. In the case of general video images, neighboring pixels have a correlation, and therefore difference values tend to incline to values with small absolute values. Hence, the high compression efficiency can be realized by using a compression algorithm utilizing a statistical inclination of code appearance frequencies such as a Huffman code.

In order to add the compressed complement signal generated by the compressing unit 203 to the reduced video signal generated by the reducing unit 201, the adding unit 204 adds the compressed complement signal to meta data of the reduced video signal.

By performing the above reduction processing and difference generation processing, the information adding unit 108 (FIG. 1) generates the output video signal.

Figure 6:
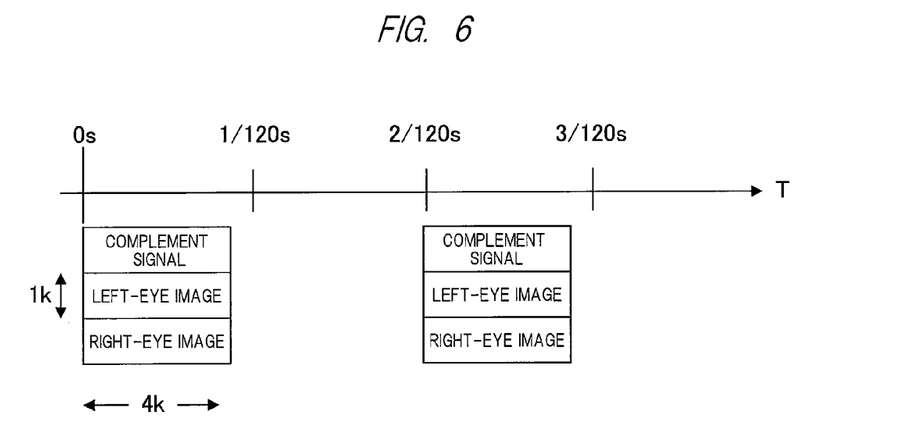
FIG. 6 is a view illustrating a video signal and a complement signal after scaling.

FIG. 6 is a view illustrating an example of the output video signal generated by the information adding unit 108 (FIG. 1), and an output video image with respect to the input video image described with reference to FIG. 5 is illustrated. A horizontal axis T represents a time like FIG. 5. A left-eye image and a right-eye image indicate one frame of a vertical ½ reduced video image generated by the reducing unit. Further, the complement signal indicates the compressed complement signal added as meta data by the adding unit.

FIG. 6 illustrates that a compressed complement signal is embedded in meta data during a blanking period of video image and the left-eye image and the right-eye image are transmitted as an output video signal by a "TOP-and-BOTTOM" method which is one of 3D video image transmitting methods. Since vertical resolutions of both of the left-eye image and the right-eye image are reduced to half by the vertical ½ reduction processing, the video signal to which a complement signal has been added can be transmitted by using an existing transmitting method without performing the resolution conversion for the "TOP-and-BOTTOM" method.

Next, complement processing in the case where the video display device 700 (FIG. 7) performs the complement processing will be described with reference to FIG. 8(b).

Figure 8B:
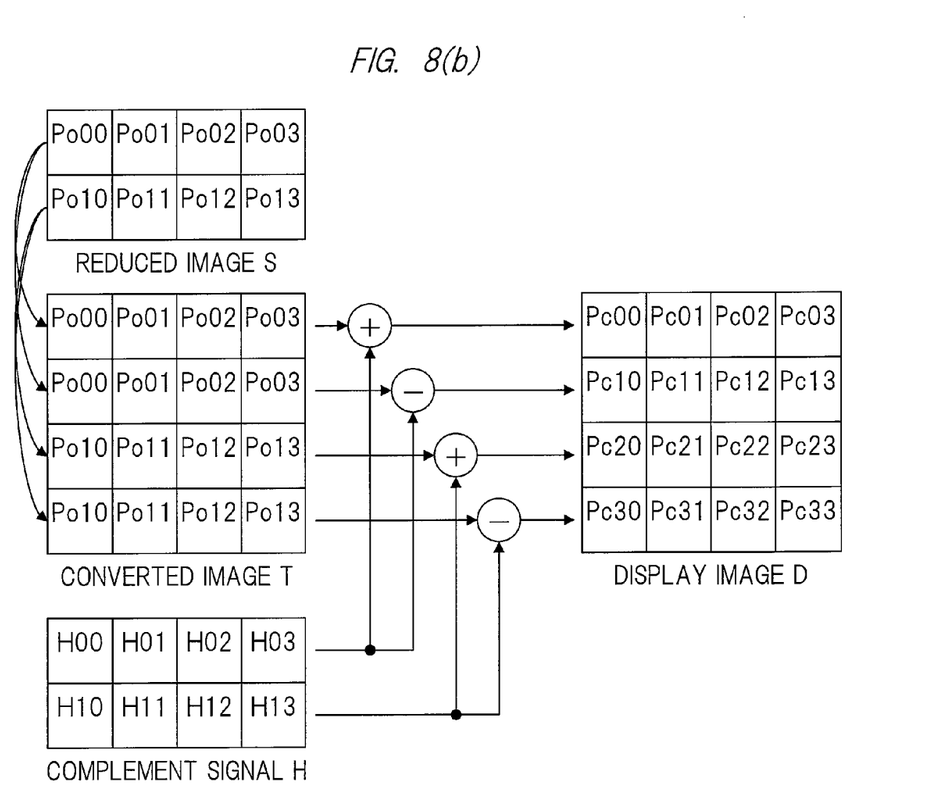
FIG. 8(b) is a view illustrating a pixel image when complement processing is performed.

FIG. 8(b) illustrates a method in which the image display device complements the 4×2 reduced image S and the complement signal H described with reference to FIG. 8(a). $Po_{00}$ to $Po_{13}$ represent pixels of the 4×2 reduced image S output from the input unit 701, $H_{00}$ to $H_{13}$ represent the complement signal H output from the decoding unit 703, and $Pc_{00}$ to $Pc_{33}$ represent pixels of a 4×4 display image D after the complement processing, which is generated by the complementing unit. Further, a converted image T represents an output signal of the converting unit 702.

The input unit 701 generates the reduced image S and the compressed complement signal as non-compressed video signals from the input signal. The converting unit 702 doubles the reduced image S for each line as illustrated by the converted image T in FIG. 8(b), thereby generating a 4×4 image.

The decoding unit 703 performs decoding processing on the compressed complement signal, thereby generating the complement signal H in FIG. 8(b). The complementing unit 704 performs complement processing on the converted image T based on the complement signal H, thereby generating the display image D. The complement processing will be described by using (equation 4) and (equation 5).

$$Pc_{mn}=Po_{mn}+H_{mn}\text{(where } m \text{ is an even number and } n \text{ is an arbitrary integer)} \quad \text{(Equation 4)}$$

$$Pc_{mn}=Po_{mn}-H_{mn}\text{(where } m \text{ is an odd number and } n \text{ is an arbitrary integer)} \quad \text{(Equation 5)}$$

The (Equation 4) is a complement equation for generating pixels of even-number lines configuring the display image D.

Similarly, the (equation 5) is a complement equation for generating pixels of odd-number lines configuring the display image D.

By performing the processing like this, it is possible to restore the pixels of the input image I in FIG. 8(a). By employing the configuration described above, it is possible to display video images of smooth motions while maintaining a frame rate, and further restore the resolution.

A method of reducing resolution in the vertical direction has been described in the present embodiment, but a method of reducing resolution in a horizontal direction also provides the same effect.

Further, the resolution reducing method has also been described by using an example of the ½ reduction. Alternatively, when the reduction processing is performed at an arbitrary magnification, the same effect can be provided by, for example, generating a reduced image by linear interpolation in which pixels are generated based on a ratio of gravity center position, using a difference value from a pixel of the reduced image located at a position closest to the gravity center of display pixels as a complement signal, and performing the complement processing based on the gravity center position. Further, the generation of complement signal may be limited to a part of a screen instead of the entire screen.

Figure 9:
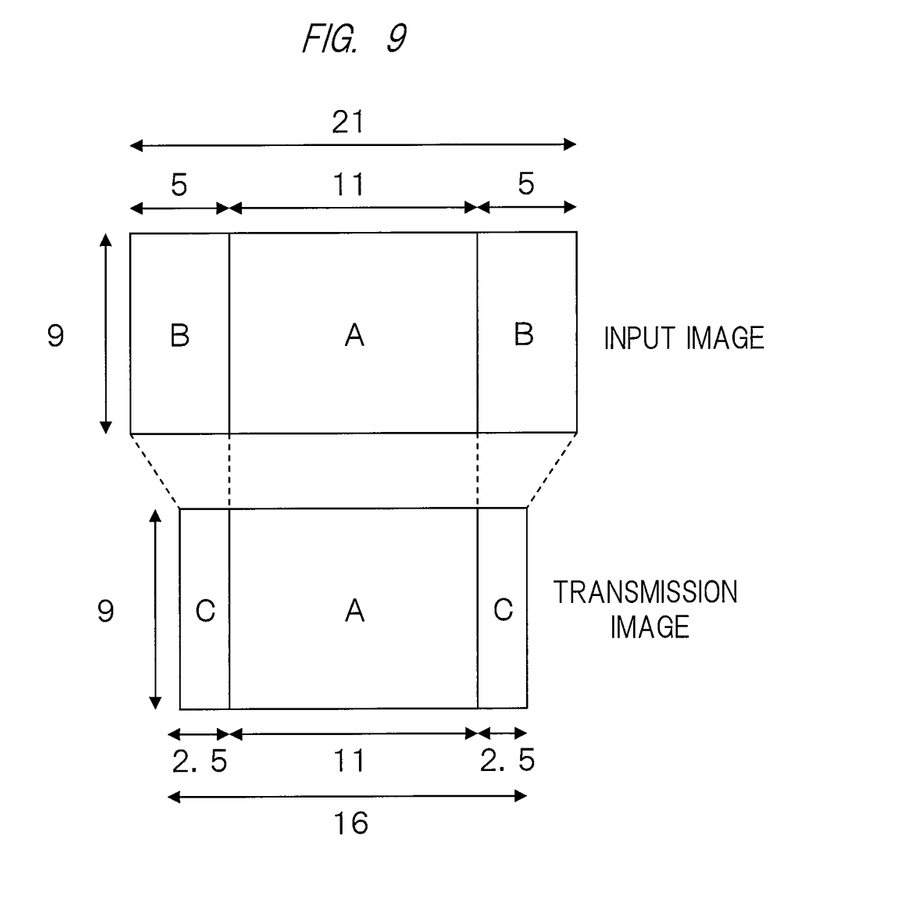
FIG. 9 is a view illustrating an example of reduction processing when an aspect ratio at the time of transmission is different.

FIG. 9 illustrates a complement signal generation range in the case where a video image with different aspect ratio is transmitted. An input image indicates one frame of an ultrawide video image input to the decoder unit 106 and having an aspect ratio of 21:9. A transmission image indicates one frame of a video signal output from the input/output unit 110 to the transmission channel. Further, an area A indicates a range of 11:9 at a center, an area B indicates a range other than the area A of the input image, and an area C indicates an area other than the area A of the transmission image.

The converting unit 107 performs horizontal ½ reduction processing on the area B of this input image, thereby generating the area C of the transmission image. The converting unit 107 does not perform the conversion processing on the area A of the input image, and uses it as the area A of the transmission image as is. By performing the above processing, the transmission image of 16:9 whose left and right parts are only reduced is generated. A video signal configured by the transmission image like this is used as a baseband video signal of an output signal.

The difference generating unit 202 generates a complement signal from the area B. Processing subsequent to the compressing unit 203 is operated as described above, and a compressed complement signal is added to the video signal. The video display device can display a video image of 21:9 by performing the complement processing on the area C.

When a video signal is transmitted, an operating frequency of a transmission channel changes in accordance with the number of pixels. Hence, when an aspect ratio of a video image changes from a video image generally transmitted in the transmission channel, a cable used for the transmission channel needs to be changed to a cable which supports the operating frequency. Consequently, by employing the above configuration, it is possible to transmit the video images of different aspect ratios without changing the transmission channel.

Further, a complement signal does not necessarily need to be generated by the video transmitting/receiving device 100. For example, the same effect can be provided by adding a complement signal as meta data of video content at a broadcast station in advance.

Second Embodiment

[Converting Unit and Information Adding Unit (Tone)]

In the second embodiment, a converting unit 107-2 and an information adding unit 108-2 in the case where the number of quantization bits of a signal is reduced so that the data amount of a video signal falls within a transmission band will be described as a modified example of the video transmitting/receiving device 100 described in the first embodiment.

Figure 3:
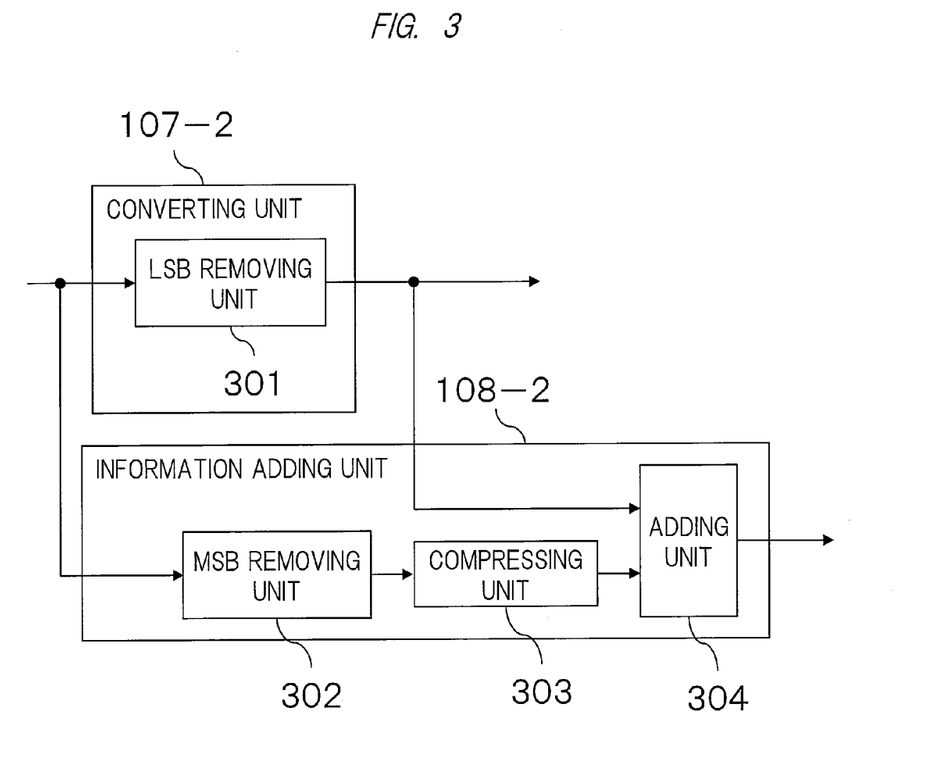
FIG. 3 is a view illustrating an example of the receiving device in the case where a tone is reduced.

FIG. 3 is a view illustrating a configuration example of the converting unit 107-2 and the information adding unit 108-2 different from the configuration of the video transmitting/receiving device 100 described in the first embodiment. Note that the configuration of the video transmitting/receiving device according to the second embodiment other than portions illustrated in FIG. 3 is the same as that in FIG. 1, and therefore, the descriptions thereof are omitted by incorporating the descriptions of the first embodiment and differences therebetween will be mainly described.

The converting unit 107-2 is configured to include an LSB (Least Significant Bit) removing unit 301 which removes lower bits of a signal for each pixel. The information adding unit 108-2 is configured by using an MSB (Most Significant Bit) removing unit 302 which removes upper bits of a signal for each pixel, a compressing unit 303 which performs compression processing to generate a compressed signal whose data amount is reduced, and an adding unit 304 which adds the compressed signal to a video signal as appropriate.

The LSB removing unit 301 removes lower bit information for each pixel with respect to a non-compressed video signal output from the decoder unit 106 (FIG. 1). The number of bits to be removed is not limited to one bit, and is determined so that the data amount of the video signal which is finally output falls within the transmission band.

For example, when an input video image is configured by 12-bit data per pixel and the data amount of the video signal is approximately 1.5 times the transmission band, the data amount of the video signal becomes ⅔ times by removing four lower bits to generate a video signal configured by eight upper bits, and falls within the transmission band.

The MSB removing unit 302 generates a complement signal by removing information other than a portion removed by the LSB removing unit 301. In the preceding example, the LSB removing unit 301 removes the four lower bits, and therefore the eight upper bits and four lower bits are the complement signal. The processing of the LSB removing unit 301 and the processing of the MSB removing unit 302 are separately performed for clarification of description, but are desirably performed concurrently. Namely, it is possible to realize the same processing by separating the signal line of each bit for transmitting the input image into those for the eight upper bits and the four lower bits and changing the connection destinations.

The compressing unit 303 and the adding unit 304 perform the same processing as those of the compressing unit 203 and the adding unit 204 described with reference to FIG. 2, thereby generating a compressed complement signal based on the complement signal generated by the MSB removing unit 302 and generating the output video signal to which the compressed complement signal has been added. When the video display device performs the complement processing, video images can be restored by setting a baseband video signal as upper bits and a complement signal as lower bits.

By employing the above configuration, it is possible to view video images whose discontinuity in tone is hard to be distinguished without increasing the transmission band.

Third Embodiment

[Converting Unit and Information Adding Unit (Color)]

In the third embodiment, a converting unit 107-3 and an information adding unit 108-3 in the case where color information of pixels is reduced so that the data amount of a video signal falls within a transmission band will be described as another modified example of the video transmitting/receiving device 100 described in the first embodiment.

Figure 4:
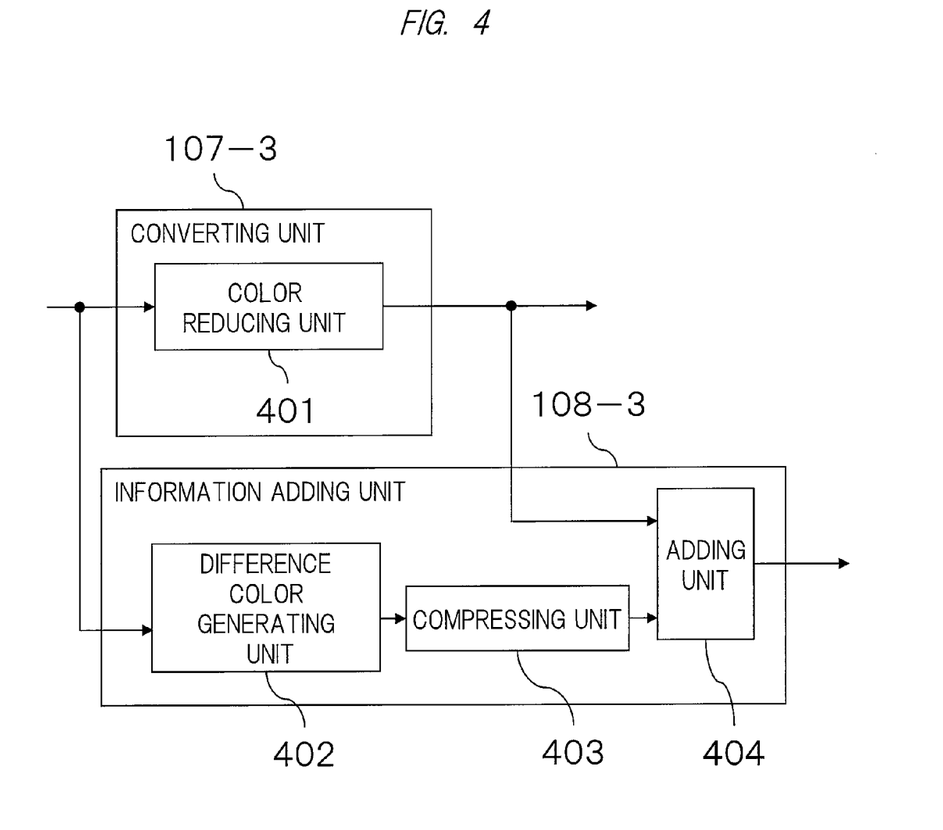
FIG. 4 is a view illustrating an example of the receiving device in the case where color information is reduced.

FIG. 4 is a view illustrating a configuration example of the converting unit 107-3 and the information adding unit 108-3 different from the configuration of the video transmitting/receiving device 100 described in the first embodiment. Note that the configuration of the video transmitting/receiving device according to the third embodiment other than portions illustrated in FIG. 4 is the same as that in FIG. 1, and therefore, the descriptions thereof are omitted by incorporating the descriptions of the first embodiment and differences therebetween will be mainly described.

The converting unit 107-3 is configured to include a color reducing unit 401 which reduces color information for each pixel. The information adding unit 108-3 is configured by using a difference color generating unit 402 which generates difference color information for each pixel, a compressing unit 403 which performs compression processing to generate a compressed signal whose data amount is reduced, and an adding unit 404 which adds the compressed signal to a video signal as appropriate.

The color reducing unit 401 reduces color information for each pixel with respect to a non-compressed video signal output from the decoder unit 106 (FIG. 1). When the non-compressed video signal input to the color reducing unit 401 adopts a 4:4:4 format which provides one color difference signal to one brightness signal as a brightness/color difference signal structure, the color reducing unit 401 reduces the color difference signal by performing conversion so that the non-compressed video signal adopts a 4:2:2 format which provides one color difference signal to each two horizontal pixels. The color difference signal after the conversion is generated based on an average value of color difference signals of two horizontal pixels. A generation equation of the color difference signal after conversion is expressed by (equation 6).

$$Co_{mn} = (Ci_{mn} + Ci_{m(n+1)})/2 \qquad \text{(Equation 6)}$$

A suffix m represents a vertical coordinate expressed by an arbitrary integer, a suffix n represents a horizontal coordinate expressed by a multiple of two, Ci represents a color difference signal of an input video image, and Co represents a color difference signal after conversion.

The difference color generating unit 402 generates difference color information for complementing a video signal converted by the color reducing unit in the video display device based on the non-compressed video signal output from the decoder unit 106. The difference color information is generated based on a difference value between color difference signals of two horizontal pixels in the case where the color reducing unit 401 converts a non-compressed video signal from the 4:4:4 format into the 4:2:2 format. A generation equation of the difference information is expressed by (equation 7).

$$H_{mn} = (Ci_{mn} - Ci_{m(n+1)})/2 \quad \text{(Equation 7)}$$

A suffix m represents a vertical coordinate expressed by an arbitrary integer, a suffix n represents a horizontal coordinate expressed by a multiple of two, Ci represents a color difference signal of an input video image, and H represents a complement signal.

The compressing unit 403 and the adding unit 404 perform the same processing as those of the compressing unit 203 and the adding unit 204 described with reference to FIG. 2, thereby generating a compressed complement signal based on the complement signal generated by the color reducing unit 401 and generating the output video signal to which the compressed complement signal has been added.

When the video display device performs the complement processing, the complement signal is added in the case where a horizontal position is an even number, and the complement signal is subtracted in the case where the horizontal position is an odd number. A complement equation in the case where the horizontal position is an even number is expressed by (equation 8), and a complement equation in the case where the horizontal position is an odd number is expressed by (equation 9).

$$Cc_{mn} = Co_{mn} + H_{mn} \quad \text{(Equation 8)}$$

$$Cc_{m(n+1)} = Co_{mn} - H_{mn} \quad \text{(Equation 9)}$$

A suffix m represents a vertical coordinate expressed by an arbitrary integer, a suffix n represents a horizontal coordinate expressed by a multiple of two, Co represents a color difference signal of an input video image, H represents a complement signal, and Cc represents a color difference signal of a display video image.

By employing the above configuration, it is possible to view video images of high color resolution without increasing a transmission band.

Note that the present invention is not limited to the embodiments described above and includes various modified examples. For examples, the embodiments above have been described in detail so as to make the present invention easily understood, and the present invention is not always limited to the embodiment having all of the described constituent elements. Also, a part of the configuration of one embodiment may be replaced with the configuration of another embodiment, and the configuration of one embodiment may be added to the configuration of another embodiment.

For example, the video transmitting/receiving device and the video display device may be integrated in each embodiment or there may be a modified example where part of components such as an optical drive unit and a recording unit are provided outside the video transmitting/receiving device. Further, another configuration may be added to a part of the configuration of each embodiment, and a part of the configuration of each embodiment may be eliminated or replaced with another configuration.

Furthermore, part or all of the above components may be configured by hardware or may be configured to be realized by executing a program by a processor. Still further, control lines and information lines are illustrated for the sake of description and do not necessarily indicate all control lines and information lines in products. Actually, it is presumable that almost all components are connected with each other.

REFERENCE SIGN LIST

100 VIDEO TRANSMITTING/RECEIVING DEVICE
101 TUNER UNIT
102 NETWORK (N/W) INTERFACE UNIT
103 OPTICAL DRIVE UNIT
104 RECORDING UNIT
105 SELECTING UNIT
106 DECODER UNIT
107 CONVERTING UNIT
108 INFORMATION ADDING UNIT
109 CONTROL UNIT
110 INPUT/OUTPUT UNIT
701 INPUT UNIT
702 CONVERTING UNIT
703 DECODING UNIT
704 COMPLEMENTING UNIT
705 CONTROL UNIT
706 DISPLAY UNIT

The invention claimed is:

1. A video transmitting/receiving device comprising:
a receiving unit which receives video content;
a converting unit which performs predetermined conversion on a video signal included in the video content;
an information adding unit which adds a complement signal to the video signal converted by the converting unit;
an input/output unit which inputs information of an external device and outputs the video signal; and
a control unit,
wherein the control unit performs control to select and output one of the video signal before performing the conversion by the converting unit, the video signal which has been converted by the converting unit, and the video signal to which the complement signal has been added by the information adding unit, in accordance with device information of the external device serving as an output destination, which is obtained by the input/output unit.

2. The video transmitting/receiving device according to claim 1,
wherein the information adding unit determines whether or not to add the complement signal in accordance with the obtained device information.

3. The video transmitting/receiving device according to claim 1,
wherein the information adding unit generates and adds the complement signal based on the video signal before performing the conversion by the converting unit and the video signal which has been converted by the converting unit.

4. The video transmitting/receiving device according to claim 3,
wherein the information adding unit includes:
a difference generating unit which generates a difference signal by comparing two input video signals;
a compressing unit which generates a compressed difference signal by performing processing of compressing a data amount of the difference signal generated by the difference generating unit; and an adding unit which adds the compressed difference signal generated by the compressing unit to the video signal, and the information adding unit adds the compressed difference signal as the complement signal by comparing the video signal before performing the conversion by the converting unit and the video signal which has been converted by the converting unit.

5. The video transmitting/receiving device according to claim 1, wherein the converting unit converts resolution of the video signal, and the information adding unit adds information for complementing the resolution of the video signal as the complement signal.

6. The video transmitting/receiving device according to claim 1, wherein the converting unit converts a tone of the video signal for each pixel, and the information adding unit adds information for complementing the tone of the video signal for each pixel as the complement signal.

7. The video transmitting/receiving device according to claim 1, wherein the converting unit converts color information of the video signal, and the information adding unit adds information for complementing the color information of the video signal as the complement signal.

8. A video display device comprising:

an input unit which receives a video signal output from the input/output unit of the video transmitting/receiving device according to claim 1, and demultiplexes the video signal to a non-compressed video signal and meta data and then outputs them;

a converting unit which performs predetermined conversion on the demultiplexed non-compressed video signal;

a decoding unit which extracts a complement signal from the demultiplexed meta data;

a complementing unit which restores and outputs the video signal by performing complement processing on the video signal output from the converting unit based on the complement signal extracted by the decoding unit; and a display unit which displays the video signal output from the complementing unit.

* * * * *